Sept. 13, 1927.
R. SIMPSON
1,642,516
ELECTRICAL MEASURING INSTRUMENT
Filed Oct. 21, 1926
2 Sheets-Sheet 1
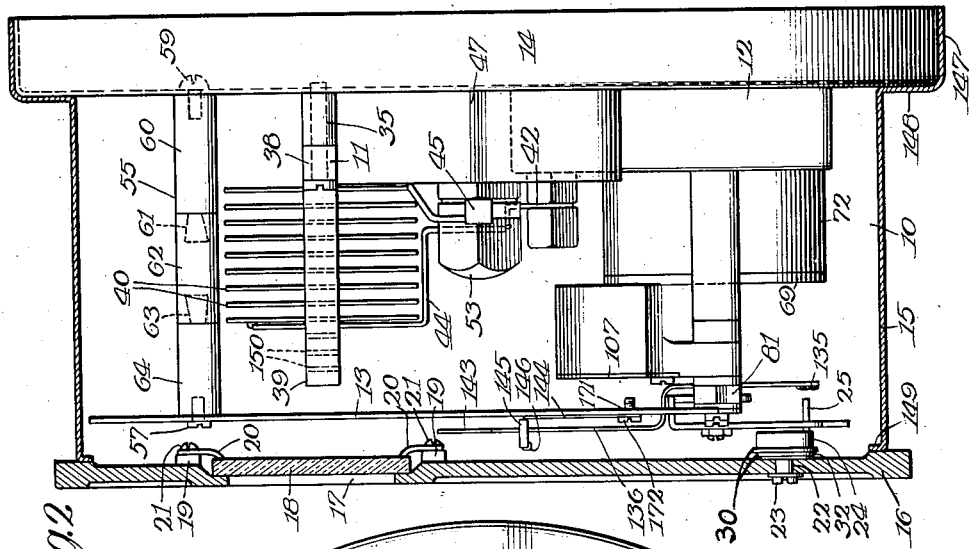
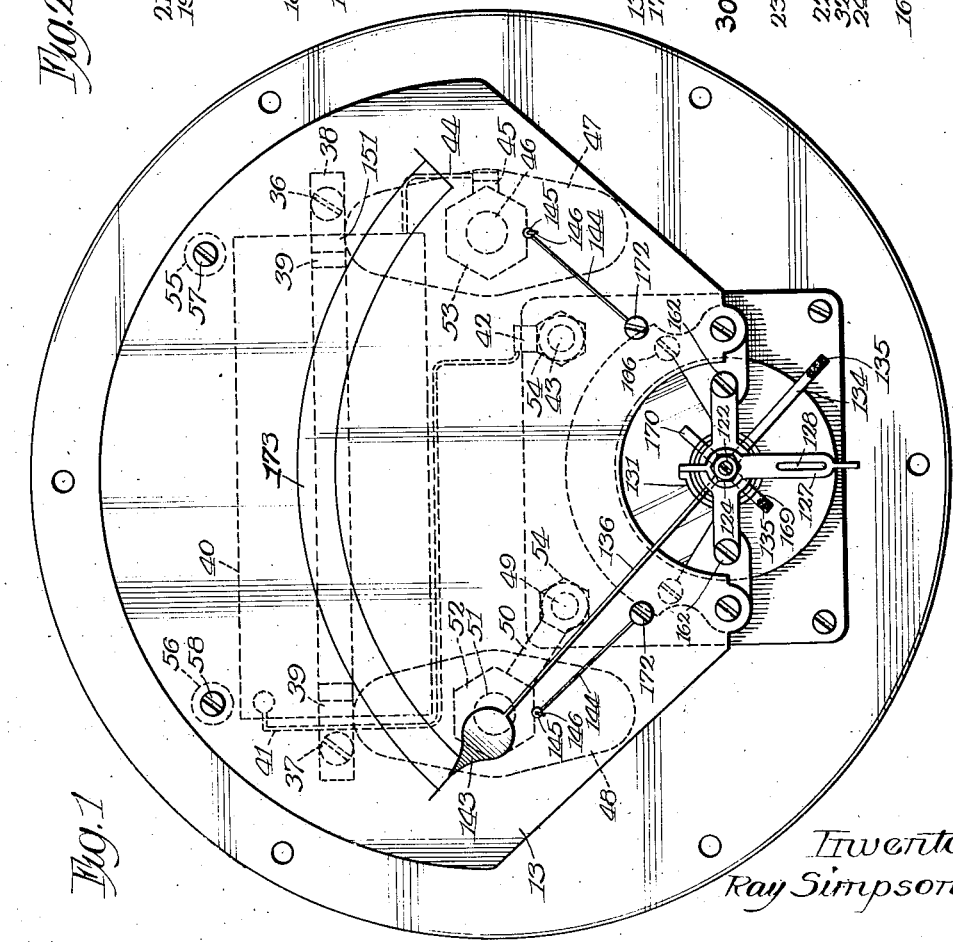
Inventor:
Ray Simpson
By Williams, Bradbury, McCaleb & Hinkle Attys.

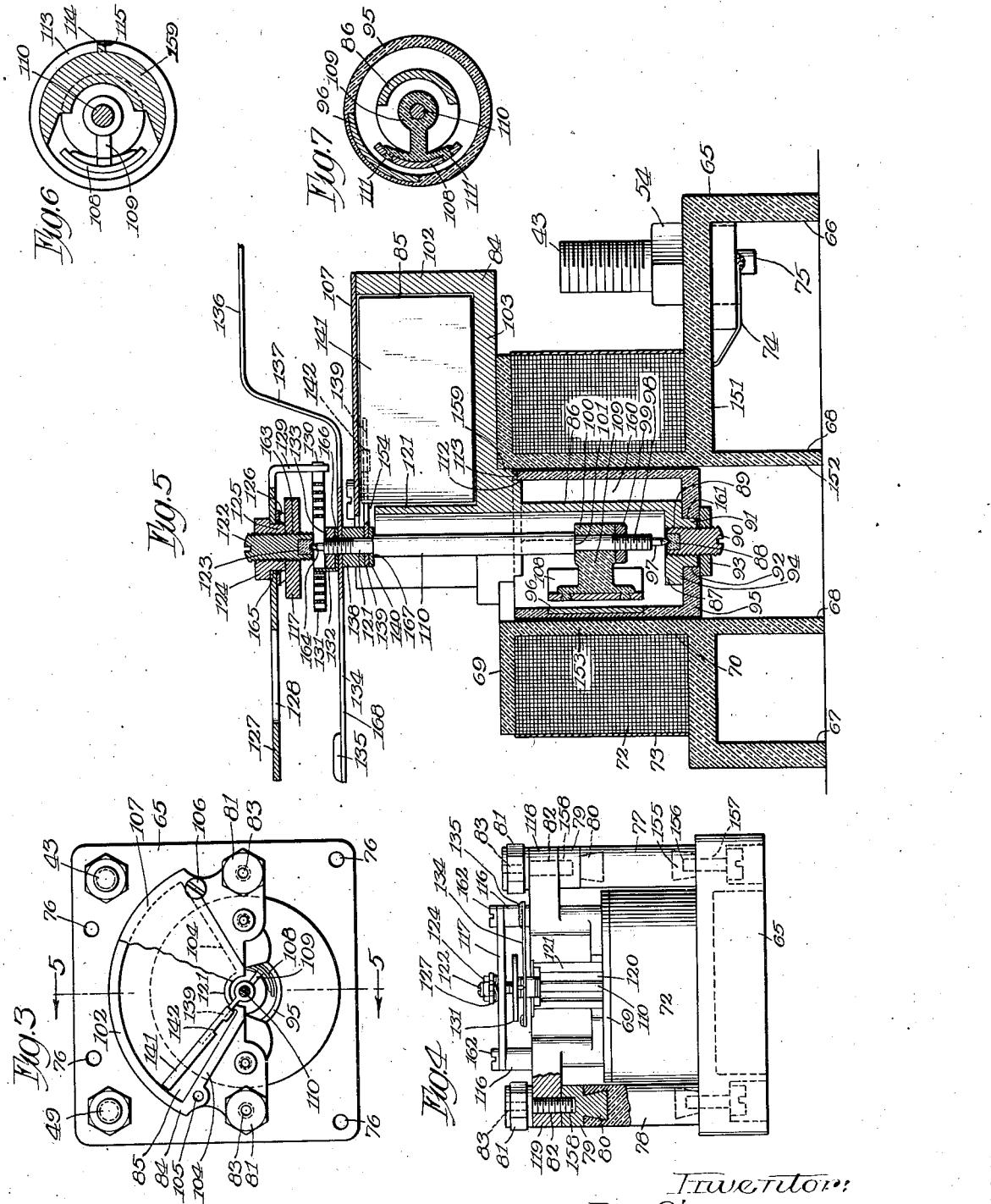

Patented Sept. 13, 1927.

1,642,516

UNITED STATES PATENT OFFICE.

RAY SIMPSON, OF RIVER FOREST, ILLINOIS, ASSIGNOR TO JEWELL ELECTRICAL INSTRUMENT CO., OF CHICAGO, ILLINOIS, A CORPORATION OF ILLINOIS.

ELECTRICAL MEASURING INSTRUMENT.

Application filed October 21, 1926. Serial No. 143,068.

My invention relates to electrical measuring instruments, more particularly to volt meters and ammeters of the moving vane type.

One of the objects of my invention is the provision of a measuring instrument in which the moving and fixed vanes are automatically spaced and insulated from each other.

Another object is the provision of removable supporting means for said vanes which automatically spaces and insulates the same.

Another object is the provision of novel supporting means for the movable vane of electrical measuring instruments.

Another object is the provision of novel coil supporting means in connection with centering and supporting means for the vanes of such measuring instruments and novel supporting means for the dials of the same.

Another object is the provision of novel stop means for the needles of delicate instruments of all kinds.

Other objects and advantages of my invention will appear more fully from the following description and the accompanying drawing in which similar characters of reference indicate similar parts throughout the several views.

Figure 1 is a plan view of a volt meter constructed according to my invention with the cover removed;

Figure 2 is a view in elevation taken from the right side of Figure 1;

Figure 3 is a plan view of the insulating base and rotating spindle of my measuring instrument partially broken away to show a damping means;

Figure 4 is a front elevation of the base and mechanism of my instrument;

Figure 5 is an enlarged cross sectional view taken on the lines 5—5 of Figure 3;

Figure 6 is a detailed cross section of the spindle and its supporting means; and Figure 7 is a cross section of the vanes showing their method of location and support.

The embodiment which I have shown to illustrate my invention consists in general of elements indicated in their entireties as follows: Casing 10, resistance 11, instrument mechanism 12, and dial 13.

Referring to Figures 1 and 2, 10 indicates the instrument casing comprising the instrument base 14, the exterior walls 15 and the cover 16. The base 14 consists of a stamped metal member of substantially cup shape, having a flat upper surface which is adapted to fit within the chamber provided by the annular flange 147, of the side walls 15 against the flange 148 of the said side walls. The exterior walls 15 of the case 10 may be constructed of sheet metal stamped to the conformation shown, which is substantially cylindrical in shape having an outturned annular flange 148 and a cylindrical flange 147 extending rearwardly therefrom. The instrument base 14 and the exterior wall 15 may be attached together by screws or any convenient fastening means, preferably passing through the same at the flange 148.

At its forward edge the exterior wall 15 may be provided with an inwardly turned annular flange 149 for the purpose of bearing against and supporting the cover 16. The cover 16 may be formed of cast or sheet metal construction of a size adapted to completely cover the opening within the flange 149 and the said cover may be attached to the said flange by screws or any convenient fastening means. At its upper portion the cover 16 is provided with a curved fenestration 17 of a shape adapted to expose completely a scale 173 upon a dial 13 which is supported under the said cover as will be further described.

The fenestration 17 is adapted to be closed by a glass window 18 of the same shape but slightly larger size which is retained in place by the spring fingers 20 bearing against the window 18, and supported by the upstanding lugs 19 and the screws 21. In order to make the said casing water proof the space between the glass 18 and the cover 16 as well as the joints between the cover 17 and the exterior walls 16, and the space between base 14 and the exterior walls 15 may be provided with a layer of felt impregnated with tar, or some other adhesive compound, in such a manner that the case 10 is practically air and moisture proof.

At its lower portion the cover 16 may be provided with a bore as at 22 which is adapted to receive the shaft 23 of the zero adjustment mechanism. The zero adjustment mechanism consists of a shaft 23 having a slotted head bearing upon one side of the cover 16 and a flattened end which is adapted to receive a molded insulating cylindrical member 24. The cylindrical member 24 may be secured to the shaft 23 by a screw, or other convenient fastening means, in such manner that the member 24 may be rotated by the slotted head of the shaft 23. Extending from the cylindrical member 24 and molded therein is the pin 25 which may be of any convenient metal and which is located eccentrically with regard to the shaft 23 and is adapted to extend into the slot 128 of the lever 127 when the cover and instrument are assembled, for a purpose further to be described. In order to retain the shaft 23 in its adjusted position there may be interposed between the cover 16 and the adjacent edge of the cylindrical member 24, a plurality of fibre washers 30 having between them a crimped spring washer 32 in such manner that the said spring washer is tensioned between the cover, the head of the shaft 23 and the cylindrical member 24, retaining said cylindrical member in any adjusted position.

Supported upon the instrument base 14 in the volt meter type of instrument is the resistance unit 11 which may consist of a cross bar 38 of metal or insulating material supported on the base 14 by screws or any other convenient fastening means passing through the spacers 35 into the cross bar 38. Supported in a similar manner upon the cross bar 38 are a plurality of posts 39 extending substantially at right angles to the said cross bar, and the posts 39 may be provided with a plurality of spaced slots 150 upon the sides toward each other, of a size adapted to receive within said slots a plurality of insulating plates 40 which are preferably constructed of mica. The mica plates 40 may be likewise cut away at each end with a groove 151 of a size adapted to receive half the posts 39, the said groove being of a shape adapted to the shape of the posts 39, here shown as substantially rectangular, in such manner that the mica plates 40 are received in the slots 150 of the posts 39 and at the same time the posts 39 extend within the grooves 151 of the mica plates. The plates are thereby spaced and held from vertical movement by the adjacent shoulders of the slots 150 and are likewise held against sliding in the slots 150 by the opposite shoulders of the grooves 151 cooperating with the sides of the posts 39.

The insulating plates 40 may be wound with spaced turns of wire of a high resistance and the respective turns on various plates may be connected together in series in such manner as to provide a resistance of an amount necessary to be used with the instrument mechanism 12 when the same is used as a volt meter.

The base 14 is provided with a plurality of binding posts 46, which may consist of a plurality of bolts 46 extending through the instrument base 14 insulated therefrom by insulating bushings 47 and 48, the said bolts 46 being sufficiently long to extend through the instrument base 14, a mounting panel, and the necessary connectors upon the rear of said mounting panel. The resistance windings upon the mica plates 40 may be connected by insulated connecting wire 41 to a connector 42 on a binding post 43 of the instrument mechanism 12 and the other end of the said resistance winding may be connected to the binding post 46 by an insulated wire 44 and the connector 45.

The instrument mechanism 12 is supported upon a molded insulating base 65 of bakelite or any other insulation having similar properties. The base 65 may consist of a flat base portion, hollow at its lower side and provided with a plurality of downwardly extending walls 66, 67, and 68 in order that parts of the instrument may be secured to the flat base portion 151 by metal screws or bolts and still be spaced from the base 14 to which the instrument base 65 is attached. The said base is provided with an open ended chamber 152, preferably cylindrical in shape, but which may be made of any other shape adapted to accomplish the results further to be described. The walls 68 of the chamber 152 extend upwardly and with a flat flange 69 form a spool 153 which is integral with the base 65. The spool 153 is wound with successive layers of shellacked paper or other suitable insulation, in between which layers are wound a multiplicity of spaced turns of fine wire in such manner that the said turns are insulated from each other, the ends of the said wire being connected to the binding posts 43 and 49 passing through the lower wall 151 of the spool 153, across underneath the said wall to the binding posts. The binding posts 43 and 49 may be constructed of threaded metal bolts having a non-circular head which is adapted to be received in a countersunk aperture of similar shape to said head in the base 65, the said binding posts being fixed to said base by nuts 54. In order to facilitate the soldering of the ends of the wire from the coil 72 to said binding posts I provide the heads of the bolts 43 and 49 with a projecting lug 75 about which the said wires may be wound and conveniently soldered.

The binding post 49 may be connected with the main binding post 51 by a flat metal connector 50 in such manner that the circuit through the said instrument when used as a volt meter is as follows: External connection may be made to binding post 46, thence through the connector 45, the wire 44, the resistance 11, the wire 41, connector 42, binding post 43, wire 74, coils 72, binding post 49 and connector 50 to the binding post 51 which is the other external terminal. When the instrument is used as an ammeter the resistance 11 is not used and the coils 72 instead of being constructed of a multiplicity of fine turns are made of relatively few turns of heavy copper wire or ribbon, the connection then being directly from the binding posts 43 and 49 to the main binding posts 46 and 51 respectively.

The measuring instrument mechanism is supported upon a die cast metal frame 84 having a lower flat wall 103 which is adapted to lie upon the upper end of the spool 69. The wall 103, together with the upstanding curved walls 102, a plurality of straight walls 104 and an inwardly curved wall 121 forms a chamber 85 having a plan of substantially fan shape and a vertical cross section of substantially rectangular shape taken on radii extending from the axis of a spindle further to be described. While I have constructed the chamber 85 of rectangular vertical cross section, this cross section may be of any convenient shape adapted to fit loosely the damping vane 141, further to be described. The chamber 85 is provided with a flat sheet metal cover 107 which may be secured to the walls of said chamber by screws 106 in apertures 105 provided therefor, or any other convenient fastening means, in such manner that the chamber 85 is completely closed with the exception of the slot 154 extending between the walls 104 in the wall 121.

Supported upon the base 65 at each side of the spool 153 are a plurality of insulating supporting posts 77 and 78 which are preferably constructed of end sections 79 of cylindrical shape and having a projection 80 of an irregular shape which is molded within the insulation of the post 77 and having at the other end of the post 77 a metal anchor 155 which may be provided with a central bore 156 screw threaded to receive the screw 157 by which the post 77 may be attached to the base 65. The end sections 79 of the post 77 may be likewise centrally bored as at 158 for the reception of attaching bolt 81. The cast metal frame 84 of the instrument mechanism is provided with a plurality of laterally extending lugs 118 and 119 of such height that when the lugs 118 and 119 lie upon the posts 77 and 78 the lower wall 103 of the cast metal frame 84 rests flatly upon the top of the spool 69, and the apertures 82 in the lugs 118 and 119 register with the bores 158 of the supporting posts 77 and 78 to which posts the lugs 118 and 119 may be secured by the bolts 81. The cast metal frame 84 is likewise provided with a downwardly extending leg 86 of the shape of a half section of a tube and the upper portion of the leg 86 as at 159 is adapted to fit snugly within the upper end of the bore 152 in the spool 153. The lower end of the leg 86 may be cut away as at 160 and at its extreme end the leg 86 is provided with a flange 87 extending at right angles thereto near the lower central portion of the bore 152. The flange 87 is centrally bored as at 89 and is screw threaded for the reception of a slotted screw 90 which is provided with a jewel 88 adapted to receive a pointed pivot 97 of substantially conical shape upon the spindle 110. The flange 87 upon its lower side is extended about the screw 90 with an annular portion 92 which is adapted to be received in an aperture in the insulating spacing shell 95.

The insulating spacing shell 95 consists of a cylindrical cup shaped member open at its upper end and supporting on its interior wall a fixed vane 96, also of the shape of a portion of the cylinder. The insulating spacing member 95 is provided with an aperture 161 at its lower end which is accurately centered with respect to the cylindrical walls and which is adapted to be received upon the annular portion 91 of the flange 87 bearing against the lower wall 94 of the flange 87 and held against said wall by a lock nut 93 upon the screw 90. The insulating spacing member 95 may be molded of bakelite, or insulating material of similar properties, with the fixed vane 96 molded in place and the exterior walls of the insulating spacing member 95 are adapted to snugly fit within the bore 152 of the spool 153 in such manner that the spindle 110 is automatically accurately spaced with regard to the coil 72 and likewise the spindle 110 is automatically maintained centered with regard to the fixed vane 96, by means of the insulating spacing member 95 which fits snugly within the bore 152 and about the annular flange 91. While I have shown the insulating spacing member 95 of cylindrical shape, because the cylindrical shape of coil is most desirable and economical, it will be evident that such a spacing member, together with the bore 152 of the spool 153, may be made of any shape providing the insulating member is adapted to fit snugly within the aperture within the spool. In order to retain the insulating spacing member 95 at its upper end the cast metal frame 84 is provided with an annular shoulder 113 adapted to fit against the upper end of the cylindrical spacing member 95 and a cylindrical shoulder 112 adapted to fit within the cylindrical spacing member 95 and the shoulders are extended about the lower portion of the cast frame 84 to preferably a greater angle than the semicircumference in order that the shoulders 112 and 113 may cooperate with the end and interior of the spacing member 95 on all sides to some extent in such manner that the insulating spacing member 95 when placed with the annular flange 91 within the aperture 161, the upper end of the insulating member 95 fits exactly within the corner formed by the shoulders 112 and 113, retaining the said insulating member 95 upon the case base 84 against any relative displacement between these two members except rotation.

In order to automatically fix and determine the location of the fixed vane 96 supported by the insulating member 95 relative to the movable vane 108 upon the spindle 110, further to be described, I provide the insulating member 95 with shoulder means cooperating with means upon the case member 84 to prevent relative rotation of the member 95 and accurately locate the vane 96 relative to the case member 84. For this purpose the insulating member 95 may be provided with a longitudinal groove 115 at its upper edge cooperating with a projection 114 extending from the shoulders 112 and 113 in such manner that the projection 114 cooperating with the opposite side of the groove 115 effectively prevents rotation of the insulating member 95 and automatically brings about the location of the fixed vane 96 relative to the case frame 84 and hence to the movable vane further to be described. I do not, however, wish to limit myself to this specific means of locating and fixing the insulating member 95 as many modifications may be made to accomplish this result as, for instance, the flange 91 and the aperture 161 of insulating member 95 might be made of non-circular cross section, thereby effectively locating and preventing rotation of said insulating member 95.

The cast metal frame 84 may be provided at the upper edges of the laterally extending lugs 118 and 119 with the upward projecting lugs 116 which are adapted to receive the cross bar 117, fixed to said lugs by the screws 162 or other convenient fastening means. The cross bar 117 is provided with an aperture 163 which is accurately centered with regard to the cylindrical shoulders 112 and 159 and with regard to the aperture 89 and the jewel 88 supporting the lower end of the spindle 110. The aperture 163 of cross bar 117 is screw threaded to receive the slotted screw 122 which is provided at its lower end with a jewel 123 adapted to receive the upper pointed end 164 of the spindle 110, which end is likewise of substantially conical shape, in such manner that the spindle 110 may be placed with its lower point 97 within the jewel 88 and the upper jewel 123 adjusted by means of a screw 122 until the point 164 is received within the conical opening of the jewel 123 and the spindle 110 is accurately pivoted between said jewels to move with a minimum of friction. Supported upon the screw 122 is a lock nut 124 having the usual non-circular shape at its upper end and a cylindrical extension at its lower end which cylindrical extension is adapted to bear upon the cross bar 117 and effectively lock the screw 122 from rotation. At the same time the cylindrical portion 125 of the lock nut 124 passes through an aperture 165 in the spring adjusting lever 127 providing a pivot for the said lever and in order to hold the said lever in its adjusted position there is interposed between the lever 127 and the cross bar 117 about the cylindrical pivot 125 a spring washer 126 consisting of a washer of resilient metal having a plurality of upwardly crimped points adjacent its edge and adapted, when the lock nut 124 bears against the cross bar 117, to be tensioned between the said cross bar and the head of the lock nut holding the lever 127 against said lock nut providing frictional resistance against rotation of said lever.

The spring adjusting lever 127 is provided with a slot 128 which is adapted to receive the pin 25 of the zero adjustment mechanism in such manner that when the shaft 23 of the zero adjustment mechanism is rotated by its slotted head the insulating member 24 rotates, the pin 25 moves eccentrically and the lever 27 is actuated by one or the other of the walls of the slot 128 to rotate the lever 127 upon its pivot 125, but such movement of the lever 127 has no effect upon the screw 122, the latter being effectively held in fixed position by the lock nut 124. The lever 127 is provided at its opposite end with downwardly extending arm 129 which is adapted to be soldered or otherwise fixed to the end of a spiral spring 131 which may be constructed of any resilient metal, such as phosphor bronze, and which is fixed at its opposite end to the upwardly extending lug 132 of a plate 166 fixed to rotate with the spindle 110 as further described hereinafter.

The spindle 110 consists of a rod of metal, preferably constructed of aluminum or some other light metal, being turned down at each end to provide a cylindrical threaded portion of a smaller size with shoulders 167 and 101 at the inward ends of said portions. At the extreme ends of the spindle 110 the said spindle may be provided with pointed bearings of substantially conical shape as previously described and which may be constructed of steel or other metal harder than the aluminum of which the main spindle is constructed. At its upper end the spindle 110 may be provided with a washer 140 bearing against the shoulder 167 and above the washer 140 an aluminum plate 139 having an aperture adapted to fit a reduced portion of the spindle 121. The plate 139 is extended laterally from the spindle 110 and at right angles thereto and is adapted to be fixed to a damping vane likewise constructed of aluminum. The damping vane 141 consists of a rectangular piece of thin aluminum plate which may be stamped with diagonally extending beads in order to reinforce the same and which has its external edges bent at right angles to form a shallow box open at one side. The upper wall of the said box may be slit in a plurality of places and the arm of the plate 139 having been placed in a corner of the said box, a portion of the wall may be turned down as at 142 about the arm 139, effectively clamping the damping vane 141 upon the arm 139 in such manner that said damping vane is supported for limited rotation upon the spindle 110 and during such rotation the damping vane 141 moves squarely across the chamber 85 substantially dividing the said chamber into two compartments by moving partition but not touching any portion of the walls of said chamber. The apertures between the damping vane 141 and the walls 103, 121, 107 and 102 of the chamber 85 permit the passage of air from one side of the damping vane to the other side when the said vane is in motion but due to the resistance caused by the pressure increase upon either side of the vane toward which it may be moving the tendency of the spindle and vane to oscillate is greatly reduced and the oscillation of the pointer hereinafter described is prevented. Above the plate 139 upon the reduced portion of the spindle 121 I provide a spacing member 138 consisting of a short section of a tube also of aluminum and above the spacing member 138 the pointer 134 is placed upon the spindle 110. The pointer 134 consists of an aluminum pointer having a rearward extension 168 and lateral extensions 169 and 170 from the point of the pivot. The said extensions may be used for balancing the said needle by placing drops of solder 135 thereon in such manner that the needle 134 is effectively balanced about the pivot provided by the spindle 110. At its forward end the needle 134 is upwardly bent as at 137 and again bent horizontally at 136 in order to bring the plane of the end of the needle up above the dial, and the end of the needle 134 is provided with a pointer 143 consisting of a piece of extremely thin aluminum foil fixed to the pointer 134 by bending portions of said foil about said pointer.

Above the pointer 134 upon the spindle 110 is placed the plate 166 having a suitable aperture and being fixed to the spring 131 as previously described and the nut 133 is threaded upon the reduced portion 121 of the spindle 110 effectively clamping the plate 166, needle 134, spacer 138, plate 139 and washer 140 against the shoulder 167 of the spindle 110 and fixing all of these parts to rotate with said spindle.

The lower end of the spindle is likewise provided with a reduced portion 98 and a shoulder 101 which is adapted to be placed through an aperture in an insulating member 109 further to be described. The insulating member 109 consists of a molded piece of insulation which supports the plate 108 having the countersunk holes 111 by molding the insulating arm 109 of bakelite or other insulation having similar properties with portions extending into the countersunk holes 111 and across the inward portion of the plate 108 in such manner that the vane or plate 108 is effectively supported upon and insulated from the spindle 110. The movable vane 108 may be constructed of a small piece of thin magnetic metal, preferably curved in shape to conform to the curvature of a concentric circle having its center located at the center of the spindle, and having a radius equal to the distance of said plate from the axis of the spindle. In a similar manner the fixed vane 96 is constructed of a small piece of magnetic metal curved concentrically with and molded in the insulating member 95 as previously described.

The insulating base 65 of the instrument mechanism may be secured to the instrument base by a plurality of screws or other fastening means and the bolts 81 which secure the cast metal frame 84 to the insulating base 65 may be provided with internally threaded bores 83 for the purpose of supporting a dial 13, further to be described. At opposite locations in the casing 10 to that of the bolts 83 I provide a plurality of posts 55 and 56 which may consist of a lower metal section 60 which is threaded at its lower end to be fixed to the base 14 by the screws 59. The upper end of the lower section 60 may be provided with a projection 61 of irregular shape and the upper section 64 of the post 55 may be of like construction but inversely arranged, having an irregular projection 63. The two sections 60 and 64 may be placed in a mold and a central section 62 molded about the extensions 61 and 63 in such manner that the post 55 consists of a lower metal section, an insulating section 62, and an upper section 64 all of the same cross section, adapted to be supported upon the base 14 by screws extending into metal and to likewise be attached to and support the dial 13 by screws 57 extending into metal sections 64.

The dial 13 is provided with a plurality of apertures located to align with the respective threaded openings in the posts 55 and 56, and the bores 83 in the bolts 81 and the said dial may be fixed to these members by a plurality of screws. Across its central portion the dial 13 is provided with a scale 173 of the usual type adapted to cooperate with the pointer 143 to indicate the volts measured. In the case of an ammeter the scale provided is made to read directly in amperes.

The dial 13 may be constructed of a flat metal piece having its upper surface covered with a layer of paper which is affixed to the said plate by any proper adhesive and the dial plate is provided with a plurality of apertures 171 screw threaded for the reception of a plurality of screws 172 supporting resilient stop members 144 on said dial on either side of the upper end of the needle 136. The resilient stop member 144 consist of a relatively fine steel wire, bent to form an eye above the screws 172 with which they are clamped to the dial 13 and extending on said dial in a radial direction from the spindle 110 toward the two extreme positions of the needle 134 at each end of the scale. The wires 144 are bent upward at their ends at substantially right angles to the dial 13 and these upward projections are passed through and covered by short tubes of porcelain, lava or other porous insulating material and the extreme ends of the wire are bent downwardly over the ends of said tubes, thereby retaining the same. The provision of porcelain of lava tubes upon the stop members 144 as distinguished from the use of glass tubes which have been used heretofore, provides a form of stop which does not accumulate a film of moisture upon its surface as in the case of the glass tubes and, therefore, presents no adhesive resistance to the separation of the needle from the said stop as has been experienced in the use of glass tubes. Furthermore, by the use of porcelain tubes the stops may be located at a much farther distance outward toward the point of the needle without introducing difficulties in having the needle stick to the stop so tightly that the needle would not be actuated by small currents or voltages. With the glass tubes the resistance caused by such adhesion of the needle to the tubes made it necessary to locate the stops at a point more near to the pivot point of the needle, thereby providing a shorter lever arm for such resistance introduced by adhesion of the needle and stop.

The operation of my electrical measuring instrument will be obvious to those skilled in the art by the foregoing description but for the purpose of rendering the description complete I will describe the operation as follows.

In the use of my instrument as a volt meter connection of the terminals 46 and 51 to a source of electrical energy of sufficient electromotive force will result in the flow of current through the circuit already described, including the resistance 11 and the coil 72. The amount of current flowing in this circuit will only depend upon the relative amount of electromotive force and the resistance of the circuit and will result in the generation of lines of magnetic flux, the direction of which will be controlled by well-known laws and which will result in the passage of flux in a certain direction through the central aperture of the coil 72 outward about the coil to meet each other in a continuous magnetic circuit. The fixed magnetic vane 96 and the movable magnetic vane 108 being included in the said magnetic circuit and presenting a much lesser reluctance to the passage of magnetic lines of flux than the air, the tendency of such lines of flux will be to pass through said magnetic vanes as far as possible and a resultant force will be developed between the two magnetic vanes due to the lines of flux through them tending to cause them to repel each other. The magnetic vane 96 being fixed and the magnetic vane 108 being pivoted, the latter pivoted upon the spindle 110, will be repelled from the former and the force tending to repel these vanes will be opposed by the spring 131. The scale 173 is accurately calibrated to indicate the number of volts impressed upon the circuit of the instrument corresponding to the relative positions of the vanes 96 and 108 and it is very essential that the relative position of this scale, the instrument mechanism supported by the frame 84, and the needle be constantly the same, a result which is insured by the fixing of the dial directly to the frame 84 by means of screws extending into the bolts 81 therein.

It will thus be observed that I have provided a novel structure for electrical measuring instruments in which the moving and fixed vanes are automatically spaced and insulated from each other, and in which the movable vane is constantly maintained centrally pivoted with regard to the fixed vane and with regard to the coil.

While I have illustrated and described the preferred form of construction for carrying my invention into effect this is capable of many modifications and I do not wish to be limited to the precise detail of construction set forth but desire to avail myself of all changes within the scope of the appended claims.

I claim:

1. In an electrical measuring instrument, a molded insulating base, having a spool formed on said base and a circular bore within said spool, a spindle disposed axially of said bore, and insulating means embracing said spindle and fitting within said bore, for maintaining said spindle in axial position.

2. In an electrical measuring instrument, a molded insulating base, having a spool formed on said base and a circular bore within said spool, a spindle disposed axially of said bore, a magnetic vane mounted on said spindle, and insulating means embracing said spindle and fitting within said bore, for maintaining said spindle in axial position.

3. In an electrical measuring instrument, a molded insulating base, having a spool formed on said base and a circular bore within said spool, a spindle disposed axially of said bore, a magnetic vane mounted on said spindle, insulating means embracing said spindle and fitting within said bore, for maintaining said spindle in axial position, and a magnetic vane molded in said insulating means.

4. In an electrical measuring instrument, a molded insulating base having a spool and a chamber within said spool, a magnetic vane pivoted to rotate in said chamber, insulating means fitting snugly in said chamber, and a fixed magnetic vane molded in said insulating means.

5. In an electrical measuring instrument, a curved magnetic vane having a plurality of countersunk apertures, and a supporting arm attached to said vane by molding said arm of insulating material with integral parts in said apertures.

6. In an electrical measuring instrument, a curved magnetic vane having a plurality of countersunk apertures, a supporting arm attached to said vane by molding said arm of insulating material with integral parts in said apertures, said arm being formed with an aperture adapted to receive a spindle, the spindle having a shoulder and means for clamping said arm on said spindle against said shoulder.

7. In an electrical measuring instrument, a molded insulating base having a spool formed on said base and a chamber within said spool, a cast metal frame having a vane pivotally supported therein, and an insulating member embracing said vane and fixedly supported on said frame, said member fitting snugly in said chamber.

8. In an electrical measuring instrument, a molded insulating base having a spool formed on said base and a chamber within said spool, a cast metal frame having a vane pivotally supported therein, an insulating member embracing said vane, and fixedly supported on said frame, said member fitting snugly in said chamber, and a fixed vane molded in said insulating member.

9. In an electrical measuring instrument, a molded insulating base having a spool formed on said base and a chamber within said spool, a cast metal frame having a vane pivotally supported therein, an insulating member embracing said vane and fixedly supported on said frame, said member fitting snugly in said chamber, a fixed vane molded in said insulating member, a pointer having an operative mechanical connection with said first name vane, and a scale supported by said frame.

10. In an electrical measuring instrument, a molded insulating base having an integral spool thereon, and a chamber within said spool, a cast metal frame upon the end of said spool and having a vane pivotally supported in said chamber, and a plurality of posts of molded insulating material supporting said frame on said base and spool.

11. In an electrical measuring instrument, a molded insulating base having an integral spool thereon, and a chamber within said spool, a vane pivotally supported in said chamber, a cast metal frame upon the end of said spool, a plurality of posts of molded insulating material supporting said frame on said base and spool, and an insulating member on said frame embracing said vane and fitting snugly within said chamber.

12. In an electrical measuring instrument, a molded insulating base having a spool formed on the same and a chamber within said spool, a cast metal frame having a vane pivotally supported therein, a cylindrical insulating member enclosing said vane and fixedly supported on said frame, said member fitting snugly in said chamber, a fixed vane molded in said insulating member, a pointer having an operative mechanical connection with said first named vane, a scale supported by said frame, and a plurality of molded insulating posts supporting said cast metal frame.

13. In an electrical measuring instrument, the combination of a spindle, jewels pivotally supporting said spindle, a pointer on said spindle and stop means for said pointer comprising a resilient wire having an upwardly turned end supporting a lava tube in transverse relation to the path of said needle.

In witness whereof, I hereunto subscribe my name this 18th day of October, 1926.

RAY SIMPSON.